United States Patent
Mc Kee et al.

[11] Patent Number: 5,837,772
[45] Date of Patent: Nov. 17, 1998

[54] DULLED THERMOPLASTIC MOLDING MATERIALS

[75] Inventors: Graham Edmund Mc Kee, Neustadt; Jürgen Koch, Neuhofen; Wolfgang Fischer, Ludwigshafen; Axel Gottschalk, Neustadt; Norbert Güntherberg, Speyer; Bernhard Rosenau, Neustadt, all of Germany

[73] Assignee: BASF Aktiengesellschaft, Ludwigshafen, Germany

[21] Appl. No.: 851,613

[22] Filed: May 6, 1997

Related U.S. Application Data

[63] Continuation of Ser. No. 596,889, Mar. 11, 1996, abandoned.

[30] Foreign Application Priority Data

Mar. 16, 1995 [DE] Germany .................. 195 09 514.6

[51] Int. Cl.$^6$ .................................................. C08L 77/00
[52] U.S. Cl. ............................................. 525/66; 525/179
[58] Field of Search ..................................... 525/66, 179

[56] References Cited

U.S. PATENT DOCUMENTS

| | | | |
|---|---|---|---|
| 4,169,869 | 10/1979 | Milenius ........................... | 525/87 |
| 4,410,661 | 10/1983 | Epstein et al. .................... | 525/66 |
| 4,612,347 | 9/1986 | Eichenauer et al. ............... | 525/73 |

FOREIGN PATENT DOCUMENTS

| | | |
|---|---|---|
| 202 214 | 11/1986 | European Pat. Off. . |
| 276 512 | 8/1988 | European Pat. Off. . |
| 319 056 | 6/1989 | European Pat. Off. . |

OTHER PUBLICATIONS

Derwent Publications, Ltd., Database WPI, Week 9010, AN 70450, XP002007829 (English abstract of JP–A 02 022 356, Jan. 25, 1990).

Derwent Publications, Ltd., DatabaseWPI, Week 8915, AN 8915 XP002007830 (English abstract of JP–A 01 056 762, Mar. 3, 1989).

Derwent Publications, Ltd., Database WPI, Week 8003, AN 4421c, XP002007831 (English abstract of JP–A 54 154 452, Dec. 5, 1979).

Derwent Publications, Ltd., Database WPI, Week 9530, AN 228820, XP002007832 (English abstract of JP–A 07 138 448, May 30, 1995).

*Primary Examiner*—Ana Woodward
*Attorney, Agent, or Firm*—Keil & Weinkauf

[57] ABSTRACT

Thermoplastic molding materials contain

A) from 50 to 99% by weight, based on the total weight of the molding material, of a toughened polymer, B) from 1 to 20% by weight, based on the total weight of the molding material, of a blend of $B_1$) a copolymer comprising polymerized units which are derived from a polymerizable carboxylic acid or derivatives thereof and $B_2$) a polyamide, C) from 0 to 40% by weight of a fibrous or particulate filler or of a mixture thereof and D) from 0 to 20% by weight of conventional additives and processing assistants.

1 Claim, No Drawings

DULLED THERMOPLASTIC MOLDING MATERIALS

This application is a continuation of application Ser. No. 08/596,889, filed on Mar. 11, 1996 now abandoned.

The present invention relates to thermoplastic molding materials containing

A) from 50 to 99% by weight, based on the total weight of the molding material, of a toughened polymer, B) from 1 to 20% by weight, based on the total weight of the molding material, of a blend of
  $B_1$) a copolymer comprising polymerized units which are derived from a polymerizable carboxylic acid or derivatives thereof and
  $B_2$) a polyamide, C) from 0 to 40% by weight of a fibrous or particulate filler or of a mixture thereof and D) from 0 to 20% by weight of conventional additives and processing assistants.

Thermoplastic molding materials containing styrene/maleic anhydride (S/MAA) copolymers, toughened styrene/acrylonitrile (S(AN) copolymers and polyamides are known per se and are described in the literature.

EP-A 276 512, DE-A 31 20 803 and DE-A 35 44 761 may be mentioned here merely by way of example. The polyamide content of these blends is as a rule 20% or more, and in some cases the polyamide forms a continuous phase in the blends. These are therefore essentially toughened polyamides which are modified with impact-resistant styrene/acrylonitrile copolymers. The S/MAA copolymers are said to improve the compatibility of the polyamide with the impact-resistant S/AN copolymer.

EP 319 056 describes blends of a graft rubber, a graft rubber containing maleic anhydride groups and a polyamide. The molding materials thus obtained lead to shaped articles having high surface gloss.

Polymers which give shaped articles having a dull surface are of increasing interest for applications in which great toughness and low light reflection (reduced dazzle) are required simultaneously, for example in the interior of automobiles or for articles having optically demanding surfaces, in order to avoid fingerprints.

In order to achieve this object, toughened thermoplastics, coarse-particled rubbers (U.S. Pat. No. 4,169,869), slightly crosslinked rubbers (DE 20 57 936) and rubbers having acidic or basic groups in the grafting base and graft were added (DE 34 05 938, EP 576 960).

In general, however, these products are still not completely satisfactory.

It is an object of the present invention to provide thermoplastic molding materials which are based on toughened thermoplastics, have great toughness and can be processed to give moldings having reduced surface gloss.

We have found that this object is achieved, surprisingly, by thermoplastic molding materials as claimed in claim 1. Preferred materials of this type are described in the subclaims. We have also found that blends of copolymers containing polymerized units which are derived from α, β-unsaturated dicarbonyl compounds or derivatives thereof and polyamides as dulling agents are suitable for toughened thermoplastics.

The novel molding materials contain, as component A), from 50 to 99, preferably from 60 to 98, and in particular from 65 to 95, % by weight, based on the total weight of the molding material, of a toughened thermoplastic.

In particular, toughened thermoplastics consisting of the components A1)+A2) described below, of which only a few preferred ones are mentioned below, and toughened thermoplastics from the series comprising the polycarbonates, polyesters, polyestercarbonates, polyamides, polyetherketones, polyethersulfones, polysulfones, polyoxyalkylenes, polyarylene sulfides, polyphenylene ethers and mixtures thereof are used as thermoplastic A) to be dulled.

The ABS, AES and ASA polymers are particularly preferred. These consist in general of at least one graft copolymer (component A1) and at least one thermoplastic (component A2), which generally contains the graft copolymers in dispersed form.

Graft copolymers A1) are generally prepared by grafting at least one of the monomers A12) stated below onto at least one of the grafting bases A11 stated below.

However, in individual cases the component A1) may not have a graft, ie. may be a single-stage polymer, and may nevertheless be (partially) compatible with the thermoplastic component A2). In this case, component A1) is identical to the description of the rubber A11).

For example, natural rubber, epichlorohydrin rubbers, ethylene/vinyl acetate rubbers, chlorosulfonated polyethylene rubbers, silicone rubbers, polyether rubbers, diene rubbers, hydrogenated diene rubbers, polyalkenamer rubbers, acrylate rubbers, ethylene/propylene rubbers, ethylene/propylene/diene rubbers, butyl rubbers and fluorine rubbers may be used as rubber A11). Acrylate rubbers, butadiene rubbers, ethylene/propylene/diene rubbers, hydrogenated butadiene and isoprene rubbers, and silicone rubbers are preferred.

Acrylate rubbers are, for example, alkyl acrylate rubbers based on one or more $C_2$–$C_{32}$-alkyl acrylates, preferably $C_2$–$C_8$-alkyl acrylates, in particular butyl, hexyl, octyl and 2-ethylhexyl acrylate. These alkyl acrylate rubbers may contain up to 30% by weight of monomers such as vinyl acetate, (meth)acrylonitrile, styrene, substituted styrene, methyl methacrylate or vinyl ethers as copolymerized units. These acrylate rubbers may furthermore contain, as copolymerized units, up to 10, preferably from 1 to 5, % by weight, based on the monomers used in the preparation of the rubber base, of polyfunctional monomers having a crosslinking action. Examples are monomers which contain two or more double bonds which are capable of copolymerization and are not conjugated in the 1,3 position. Examples of suitable crosslinking monomers are divinylbenzene, diallyl maleate, diallyl fumarate, diallyl phthalate, triallyl cyanurate, triallyl isocyanurate, triallyl phosphate and allyl methacrylate. The acrylate of tricyclodecenyl alcohol has proved to be a particularly advantageous crosslinking monomer (cf. German Patent 1,260,135).

Other suitable acrylate rubbers are products which contain a crosslinked diene rubber comprising one or more conjugated dienes, such as polybutadiene or a copolymer of a conjugated diene with an ethylenically unsaturated monomer, such as styrene and/or acrylonitrile, as the core and one or more further grafts, at least one of these being an acrylate rubber.

Diene rubbers are, for example, homopolymers of conjugated dienes of 4 to 8 carbon atoms, such as butadiene, isoprene, piperylene and chloroprene, copolymers of such dienes with one another and copolymers of such dienes with styrene, acrylate or methacrylate compounds (eg. acrylonitrile, methacrylonitrile, acrylic acid, methacrylic acid, butyl acrylate, ethylhexyl acrylate and methyl methacrylate).

Particularly preferred diene rubbers are butadiene, butadiene/styrene, butadiene/methyl methacrylate, butadiene/butyl acrylate and butadiene/acrylonitrile rubbers.

Suitable silicone rubbers may be, for example, crosslinked silicone rubbers comprising units of the general formulae $R_2SiO$, $RSiO_{3/2}$, $R_3SiO_{1/2}$ and $SiO_{2/4}$, where R is a monovalent radical. The amounts of the individual siloxane units are such that from 0 to 10 molar units of the formula $RSiO_{3/2}$, from 0 to 1.5 molar units of $R_3SiO_{1/2}$ and from 0 to 3 molar units of $SiO_{2/4}$ are present per 100 units of the formula $R_2SiO$. R may be either a monovalent saturated hydrocarbon radical of 1 to 18 carbon atoms, phenyl, alkoxy or a group susceptible to free radical attack, such as vinyl or mercaptopropyl. It is preferable if at least 80% of all radicals R are methyl; combinations of methyl and ethyl or methyl are particularly preferred.

Preferred silicone rubbers contain incorporated units of groups which are susceptible to free radical attack, in particular vinyl, allyl, halogen or mercapto, preferably in amounts of from 2 to 10 mol %, based on all radicals R.

They can be prepared, for example, according to EP-A-260 558.

Suitable monomers for the formation of the graft A12) are generally selected from at least one of the groups A121) and A122) below.

A121) Styrene and its substituted derivatives, eg. α-methylstyrene, α-chlorostyrene, p-chlorostyrene, 2,4-dichlorostyrene, p-methylstyrene, 3,4-dimethylstyrene, p-tert-butylstyrene, o- and p-divinylbenzene, p-methyl-α-methylstyrene and p-chloro-α-methylstyrene, and methyl methacrylate; styrene and α-methylstyrene are preferred.

A122) Acrylate and methacrylate compounds, eg. acrylonitrile, methacrylonitrile, acrylic and methacrylic acid, methyl acrylate, ethyl acrylate, n-propyl and isopropyl acrylate, n-butyl and isobutyl acrylate, tert-butyl acrylate, 2-ethylhexyl acrylate, methyl methacrylate, ethyl methacrylate, n-propyl and isopropyl methacrylate, n-butyl and isobutyl methacrylate, tert-butyl methacrylate, cyclohexyl methacrylate, isobornyl methacrylate, maleic anhydride and its derivatives, such as maleates, diesters of maleic acid and maleimide, for example alkyl- and arylmaleimides, such as methyl- or phenylmaleimide, preferably acrylonitrile, methyl methacrylate, maleic anhydride and phenylmaleimide.

Preferred preparation processes for A1) are emulsion, solution, mass or suspension polymerization. The polymers A1) can be particularly preferably prepared by free radical emulsion polymerization. In particular, the graft copolymers A1) can be produced by free radical emulsion graft polymerization of the monomers A12 in the presence of rubber latices of the component A11) at from 20° to 90° C. using water-soluble or partially oil-soluble initiators, such as peroxodisulfate, or with the aid of redox initiators. In the case of redox initiators, the polymerization temperature may also be below 20° C.

However, it is also possible to use rubbers which already consist of preformed core/shell rubber particles. For example, the core may consist of a polybutadiene rubber or a silicone rubber or of a styrene or methyl methacrylate homo- or copolymer, eg. styrene/acrylonitrile. The shell may then consist of, for example, an acrylate (EP-A-260 558). By a single grafting stage or a plurality of stepwise grafting stages, one or more grafts can be applied to the rubber particles, and each graft may have a different composition. In addition to the grafting monomers, polyfunctional monomers containing crosslinking or reactive groups may be concomitantly grafted on (for example according to EP-A-230 282, German Laid-Open Application DOS 3,601,419 and EP-A-269 861).

The component A) consists of from 5 to 94, preferably from 10 to 78, in particular from 20 to 65, % by weight of the graft copolymer (elastomer) A1) and from 6 to 95, preferably from 22 to 90, in particular from 35 to 80, % by weight of the hard matrix A2.

The elastomers A1 contain in general from 10 to 100, preferably from 20 to 90, particularly preferably from 30 to 85, % by weight: of base rubber A11 and up to 90, preferably from 10 to 80, particularly preferably from 15 to 70, % by weight of graft-copolymerized monomers A12.

The monomers A121) are generally used in an amount of from 50 to 100, preferably from 60 to 95, % by weight and the monomers A122 in an amount of up to 50, preferably from 5 to 40, % by weight. However, A12) may consist of 100% by weight of (meth)acrylates, for example of a mixture of methyl methacrylate and methyl acrylate.

In these polymers A11) the rubbers are generally present in the form of crosslinked or partially crosslinked particles. The average particle size d(50) of the polymers A1 is in general from 0.05 to 10 μm, preferably from 0.08 to 1 μm.

Vinyl polymers and (meth)acrylate polymers, and homo- and copolymers, can preferably be prepared as novel component A2) from the monomers stated under A121) and A122). Examples of suitable homo- and copolymers are polystyrene, polymethyl methacrylate, styrene/acrylonitrile copolymers, α-methylstyrene/acrylonitrile copolymers, styrene/maleic anhydride copolymers, styrene/phenylmaleimide copolymers, styrene/methyl methacrylate copolymers, methyl methacrylate/acrylonitrile copolymers, styrene/acrylonitrile/maleic anhydride copolymers, styrene/acrylonitrile/phenylmaleimide copolymers, α-methylstyrene/acrylonitrile/methyl methacrylate copolymers, α-methylstyrene/acrylonitrile/tert-butyl methacrylate copolymers and styrene/acrylonitrile/tert-butyl methacrylate copolymers.

Such copolymers are frequently formed in the graft polymerization for the preparation of the graft copolymer A1, particularly when large amounts of monomers A12 are grafted onto small amounts of rubber A11. The vinyl polymers and (meth)acrylate polymers can be prepared by means of known free radical, anionic and cationic polymerization processes. The known redox polymerization or the known polymerization with organometallic mixed catalysts may also be advantageous.

Preferred ASA, AES and ABS polymers as component A) contain from 6 to 95, preferably from 22 to 90, in particular from 35 to 80, % by weight of a copolymer A2) of from 50 to 95, preferably from 55 to 90, in particular from 60 to 85, % by weight of vinylaromatic monomers and from 5 to 50, preferably from 10 to 45, particularly preferably from 15 to 40, % by weight of polar copolymerizable monomers selected from the group consisting of acrylonitrile, methacrylonitrile, esters of (meth)acrylic acid where the alkyl radical is of 1 to 4 carbon atoms, maleic anhydride, (meth)acrylamide, vinyl alkyl ethers where the alkyl radical is of 1 to 8 carbon atoms and/or phenylmaleimide and mixtures thereof.

Styrene and substituted styrenes of the general formula

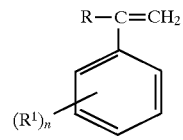

where R is alkyl of 1 to 8 carbon atoms, hydrogen or halogen, $R^1$ is alkyl of 1 to 8 carbon atoms or halogen and n is 0, 1, 2 or 3, have proven useful vinylaromatic monomers.

The graft copolymer, which accounts for in general from 5 to 94, preferably from 10 to 78, in particular from 20 to 65, % by weight, based on the total weight of the component A), is composed of A11) from 10 to 100, preferably from 20 to 90, in particular from 30 to 85, % by weight of a grafting base composed of A111) from 50 to 100, preferably from 55 to 98, in particular from 60 to 95, % by weight, based on A11), of an alkyl acrylate where the alkyl radical is of 1 to 30 carbon atoms and/or of a diene, A112) from 0 to 50, preferably from 0 to 45, in particular from 0 to 40, % by weight, based on A11), of a further monounsaturated monomer copolymerizable with A111) and A113) from 0 to 5, preferably from 0.05 to 4, in particular from 0.1 to 4, % by weight, based on A11), of a bifunctional or polyfunctional monomer having a crosslinking action.

Preferred monomers A111) are alkyl acrylates where the alkyl radical is of 2 to 30 carbon atoms, in particular ethyl acrylate, tert-butyl acrylate, isobutyl acrylate, n-butyl acrylate and 2-ethylhexyl acrylate, of which the two last-mentioned ones are particularly preferred.

Preferred dienes A111) are isoprene and butadiene and preferred monomers A112) are styrene, acrylonitrile, methacrylonitrile and/or vinyl alkyl ethers where the alkyl radical is of 1 to 8 carbon atoms (eg. vinyl methyl ether, vinyl propyl ether or vinyl ethyl ether) or mixtures thereof.

Examples of bifunctional monomers A113) having a crosslinking action are divinylbenzene, diallyl maleate, diallyl fumarate, diallyl phthalate and dihydrodicyclopentadienyl acrylate (DCPA, as described in DE-A 12 60 135), the last-mentioned monomer being preferred.

Processes for the preparation of polymers A11) are known to a person skilled in the art and are described in the literature, for example in German Patent 1,260,135. Appropriate products are also commercially available.

Preparation by emulsion polymerization has proven particularly advantageous in some cases.

The exact polymerization conditions, in particular the type, metering and amount of the emulsifier, are preferably chosen so that the latex of the acrylate, which is at least partially crosslinked, has an average particle size (weight average $d_{50}$) of from about 50 to 700 nm, in particular from 100 to 600 nm.

A graft A12) which is obtained by copolymerization of

A121) from 50 to 100, preferably from 60 to 95, in particular from 65 to 85, % by weight of a vinylaromatic monomer, preferably styrene or substituted styrenes of the general formula I

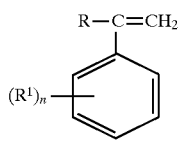

where R is alkyl of 1 to 8 carbon atoms, hydrogen or halogen, $R^1$ is alkyl of 1 to 8 carbon atoms or halogen and n is 0, 1, 2 or 3, and A122) from 0 to 50, preferably from 5 to 40, in particular from 15 to 35, % by weight of polar copolymerizable monomers such as acrylonitrile, methacrylonitrile, esters of (meth)acrylic acid where the alkyl radical is of 1 to 20 carbon atoms, maleic anhydride, (meth)acrylamide, vinyl alkyl ethers where the alkyl radical is of 1 to 8 carbon atoms and/or phenylmaleimide or mixtures thereof is grafted onto the grafting base A11).

However, the graft may consist of one or more (meth)acrylates, for example of a mixture of methyl methacrylates and an acrylate such as methyl, ethyl or butyl acrylate.

The graft A12) may be prepared in one process step or in a plurality of process steps, for example two or three, the gross composition being unaffected thereby.

The graft is preferably prepared in emulsion, as described, for example, in German Patent 1,260,135 and German Laid-Open Applications DOS 3,227,555, DOS 3,149,357, DOS 3,149,358 and DOS 3,414,118.

Depending on the conditions chosen, a certain proportion of free copolymers of, for example, styrene and acrylonitrile is formed in the graft copolymerization.

The graft copolymer (A11+A12) generally has an average particle size of, preferably, from 50 to 1000 nm, in particular from 100 to 700 nm ($d_{50}$ weight average). The conditions in the preparation of the elastomer A11) and in the grafting are therefore preferably chosen so that particle sizes in this range result. The relevant measures are known and are described, for example, in German Patent 1,260,135, German Laid-Open Application DOS 2,826,925 and J. Appl. Polym. Sci. 9 (1965), 2929–2938. The particle size of the latex of the elastomer can be increased, for example, by means of agglomeration.

In some cases, blends of a plurality of acrylate polymers which have different particle sizes have proven useful. Corresponding products are described in German Laid-Open Application DOS 2,826,925 and U.S. Pat. No. 5,196,480, to which reference is made here for further details.

Accordingly, preferably used blends of acrylate polymers are those in which a first polymer has a particle size $d_{50}$ of from 50 to 150 nm and a second polymer has a particle size of from 200 to 700 nm, as described in the abovementioned U.S. Pat. No. 5,196,480.

The novel thermoplastic molding materials contain, as component B), from 1 to 20, preferably from 2 to 18, in particular from 5 to 15, % by weight of a blend of $B_1$) a copolymer having polymerized units which are derived from a polymerizable carboxylic acid or functional derivatives thereof and $B_2$) a polyamide.

The ratio of components $B_1$) to $B_2$) is not subject per se to any special restriction and is in general from 10:1 to 1:10, preferably from 5:1 to 1:5, particularly preferably from 3:1 to 1:3.

The component $B_1$) is preferably a copolymer of essentially vinylaromatic monomers and/or ethylene and the stated carboxylic acids or derivatives thereof, the amount of vinylaromatics and/or ethylene in the monomer mixture being preferably from 40 to 99.5, particularly preferably from 50 to 99, in particular from 60 to 99, % by weight.

Preferably used vinylaromatic monomers are styrene and styrene derivatives, eg. α-methylstyrene, o-, m- and p-methylstyrene, chlorostyrene and mixtures of these compounds.

Acrylic acid, methacrylic acid, fumaric acid and maleic acid may be mentioned here merely as typical examples of polymerizable carboxylic acids.

The functional derivatives of polymerizable carboxylic acids are preferably carboxylic anhydrides, carboxamides, N-phenylcarboximides and/or carboxylates. Maleic anhydride, N-phenylmaleimide, $C_1$–$C_8$-alkyl esters, amides, $C_1$–$C_8$-alkyl- or dialkylamides and salts, in particular metal salts of main groups I and II of the Periodic Table may be mentioned here merely as typical functional derivatives.

Methyl maleic anhydride, chloromaleic anhydride, citraconic anhydride, butenylsuccinic anhydride, tetrahydrophthalic anhydride and esters and half-esters of polymerizable acids with primary, secondary or tertiary alkanols, such as methanol, ethanol, n-propanol, isopropanol, n-butanol, sec-butanol and tert-butanol, and the corresponding amides and N-phenylmaleimide are also suitable. Carboxylic anhydrides, N-phenylcarboximides and esters are in turn preferred.

Components $B_1$) which contain. from 60 to 99% by weight of styrene, from 1 to 15% by weight of maleic anhydride and from 0 to 39% by weight of methyl methacrylate and/or acrylonitrile or from 60 to 95% by weight of styrene, from 5 to 20% by weight of acrylic and/or methacrylic acid and from 0 to 25% by weight of acrylonitrile, acrylates and/or methacrylates are particularly preferred.

The viscosity number (VN) of component $B_1$) is preferably from 20 to 120, in particular from 50 to 90, $cm^3/g$ (determined at 25° C. in 0.5% strength dimethylformamide solution using an Ubbelohde viscometer according to DIN 53 726/8), which corresponds to a molecular weight of, preferably, from 5000 to 500,000, particularly preferably from 20,000 to 200,000.

In a further embodiment, the component $B_1$) may also contain further copolymerizable monomers, in particular vinyl acetate and/or (meth)acrylonitrile, in amounts of up to 37% by weight, in addition to the polymerizable carboxylic acid or functional derivatives thereof.

Processes for the preparation of component $B_1$) are known per se. A preferred embodiment is the continuous, thermal or free radical polymerization of monomers at from 120° to 160° C. in a residence time of from 2 to 8 hours, with or without the use of solvents, eg. ethylbenzene. Ethylene-containing copolymers are usually prepared at elevated temperatures under high pressure.

The polyamides which can be used as component $B_2$) are known per se. Semicrystalline or amorphous resins having a molecular weight of at least 5000, as described, for example, in DE-C-20 71 250, DE-C-20 71 251, DE-C-21 30 523, DE-C-21 30 948, DE-C-22 41 322, DE-C-23 12 966, DE-C-25 12 606 and DE-C-33 93 210, are preferred.

Examples of these are polyhexamethyleneadipamide, polyhexamethyleneazelaamide, polyhexamethylenesebacamide, polyhexamethylenedodecanediamide, poly-11-aminoundecanamide and bis(p-aminocyclohexyl)methanedodecanediamide and the products obtained by ring cleavage of lactams, for example polycaprolactam or polylaurolactam. Polyamides based on terephthalic or isophthalic acid as the acid component and/or trimethylhexamethylenediamine or bis(p-aminocyclohexyl)propane as the diamine component and polyamide base resins which have been prepared by copolymerization of two or more of the abovementioned polymers or components thereof are also suitable. An example of these is a copolycondensate of adipic acid, isophthalic acid and hexamethylenediamine.

Other preferred polyamides are copolyamides, for example based on nylon 6/nylon 66 in a ratio of from 10:1 to 1:10, preferably from 7:1 to 1:1.

The preparation of these polyamides is likewise described in the abovementioned publications. The ratio of terminal amino groups to terminal acid groups can be controlled by varying the molar ratio of the starting compounds.

In addition to the components A) and B), the novel thermoplastic molding materials may contain, as component C), from 0 to 40, preferably up to 30, % by weight of fibrous or particulate fillers or mixtures thereof, as known to a person skilled in the art for polymer blends of this type and as described in the literature.

Finally, from 0 to 20, preferably up to 10, % by weight of conventional additives and processing assistants, which are likewise known to a person skilled in the art, may also be present as component D).

The novel thermoplastic molding materials can be prepared in a manner known per se, by mixing the components in the melt, preferably in an extruder. Appropriate processes are known to a person skilled in the art and are described in the literature, se that further information is unnecessary here.

The novel thermoplastic molding materials are particularly suitable for the production of all types of finished articles having a dull surface, by injection molding or extrusion.

EXAMPLES 1 to 9

The following components were used:

A) Mixture of 50% by weight of a graft rubber prepared in emulsion and having a grafting base comprising 98% by weight of n-butyl acrylate and 2% by weight of dihydrodicyclopentadienyl acrylate, grafted with a mixture of styrene (75% by weight) and acrylonitrile (25% by weight) (particle size $d_{50}$=0.5 μm, ratio of grafting base to graft=60:40) and 50% by weight of a styrene (65% by weight)/acrylonitrile (35% by weight) copolymer prepared in solution and having a viscosity number of 80 ml/g, measured in 0.5% strength by weight solution in dimethylformamide (DMF) at 23° C.

$B_1$/1) Reaction product of a styrene/maleic anhydride copolymer (weight ratio 58:42) with aniline, having 8 mol % of free MAA units and a molecular weight of 135,000 g/mol.

$B_1$/2) As for $B_1$/1, but with 12 mol % of free MAA units.

$B_1$/3) Styrene/MAA copolymer (weight ratio 50:50) having a molecular weight $M_w$ of 350,000 g/mol.

$B_1$/4) Copolymer of

75% by weight of styrene,

21% by weight of acrylonitrile and

4% by weight of MAA, having a viscosity number of 80 ml/g, measured in 0.5% strength by weight solution in DMF at 23° C.

$B_2$) Copolyamide of 85% by weight of poly-ε-caprolactam and 15% by weight of polyhexamethyleneadipamide, having a viscosity number of 195 ml/g, measured in 0.5% strength by weight solution in concentrated $H_2SO_4$ at 25° C. (DIN 53 727).

Preparation of the blends

The blends stated in the Table were prepared in a ZSK 30 extruder from Werner & Pfleiderer:

After their preparation, the products were processed to circular discs (60×2 mm) (gloss measurements) and to standard small bars (notched impact strength measurements) at 220° C. and at a mold temperature of 60° C.

TABLE

| Example | Composition | AK [kJ/mm$^2$]**) | Gloss [%]***) |
|---|---|---|---|
| 1V*) | 95 parts by weight of A<br>5 parts by weight of B$_1$/4 | 19 | 80 |
| 2 | 90 parts by weight of A<br>5 parts by weight of B$_1$/4<br>5 parts by weight of B$_2$ | 24 | 20 |
| 3 | 90 parts by weight of A<br>5 parts by weight bf B$_1$/2<br>5 parts by weight of B$_2$ | 21 | 12 |
| 4V*) | 95 parts by weight of A<br>5 parts by weight of B$_1$/2 | 18 | 40 |
| 5 | 85 parts by weight of A<br>10 parts by weight of B$_1$/1<br>5 parts by weight of B$_2$ | 19 | 11 |
| 6V*) | 90 parts by weight of A<br>10 parts by weight of B$_1$/1 | 15 | 44 |
| 7 | 90 parts by weight of A<br>5 parts by weight of B$_1$/3<br>5 parts by weight of B$_2$ | n. m. | 16 |
| 8V*) | 95 parts by weight of A<br>5 parts by weight of B$_1$/3 | n. m. | 40 |
| 9V*) | 100 parts by weight of A | 20 | 86 |

*)Comparative experiment
**)AK: Notched impact strength at 23° C., measured according to DIN 53 453-K (edition 5/75)
***)Gloss: Measured at an angle of 45° (reflection) using a GP2 Goniophotometer from Zeiss

We claim:

1. A dulled molding material comprising

A) an AES or ASA polymer and

B) as a dulling agent from 1 to 10% by weight, based on the total weight of the molding material, of a blend of B$_1$) a copolymer comprising polymerized units which are derived from a polymerizable carboxylic acid or derivatives thereof selected from the group consisting of carboxylic acids, carboxylic anhydrides, carboxamides, N-phenylcarboximides, carboxylates, and mixtures thereof and B$_2$) a polyamide.

* * * * *